United States Patent [19]

Kidrin

[11] Patent Number: 5,423,555
[45] Date of Patent: Jun. 13, 1995

[54] INTERACTIVE TELEVISION AND VIDEO GAME SYSTEM

[76] Inventor: Thom Kidrin, 11 Royal Rd., Brookline, Mass. 02146

[21] Appl. No.: 48,417

[22] Filed: Apr. 14, 1993

[51] Int. Cl.⁶ ............................................. A63F 9/22
[52] U.S. Cl. ......................... 273/434; 273/148 B; 273/85 G; 273/DIG. 28; 364/410
[58] Field of Search ............... 293/85 G, 434–438, 293/148 B, DIG. 28; 364/410; 358/84–86; 455/6.3; 178/18–20; 200/600

[56] References Cited

U.S. PATENT DOCUMENTS

| | | | |
|---|---|---|---|
| 3,728,480 | 4/1973 | Baer | 273/434 X |
| 4,247,106 | 1/1981 | Jeffers et al. | 273/85 G |
| 4,253,116 | 2/1981 | Rodgers, III | 358/149 |
| 4,312,016 | 1/1982 | Glaab et al. | 358/188 |
| 4,604,509 | 8/1986 | Clancy et al. | 200/159 B |
| 4,695,953 | 9/1987 | Blair et al. | 364/410 |
| 4,707,845 | 11/1987 | Krein et al. | 178/19 |
| 4,766,541 | 8/1988 | Bleich et al. | 364/410 |
| 4,766,581 | 8/1988 | Korn et al. | 369/30 |
| 4,890,833 | 1/1990 | Lantz et al. | 273/85 G |
| 5,008,497 | 4/1991 | Asher | 178/18 |

*Primary Examiner*—Vincent Millin
*Assistant Examiner*—Kerry H. Owens
*Attorney, Agent, or Firm*—Amster, Rothstein & Ebenstein

[57] ABSTRACT

An interactive video game-television system wherein video game cartridge information is accessed in response to encoded signals transmitted with NTSC television signals. The encoded signals are decoded and provided to access the video game system which outputs an RGB video game signal. The RGB video game signal is synchronized by the synchronization data from the television signal and converted to an NTSC video game signal which is selectively displayed with the NTSC television signal. User interaction with the NTSC video game signal by input at a remote or wired hand controller is provided to the video game system for interacting with the NTSC video game signal.

30 Claims, 5 Drawing Sheets

NTSC
TELEVISION ONLY

VIDEO
GAME ONLY

CONGRATULATIONS
YOU DID IT!

NTSC TELEVISION
WITH OVERLAY

NTSC
TELEVISION ONLY

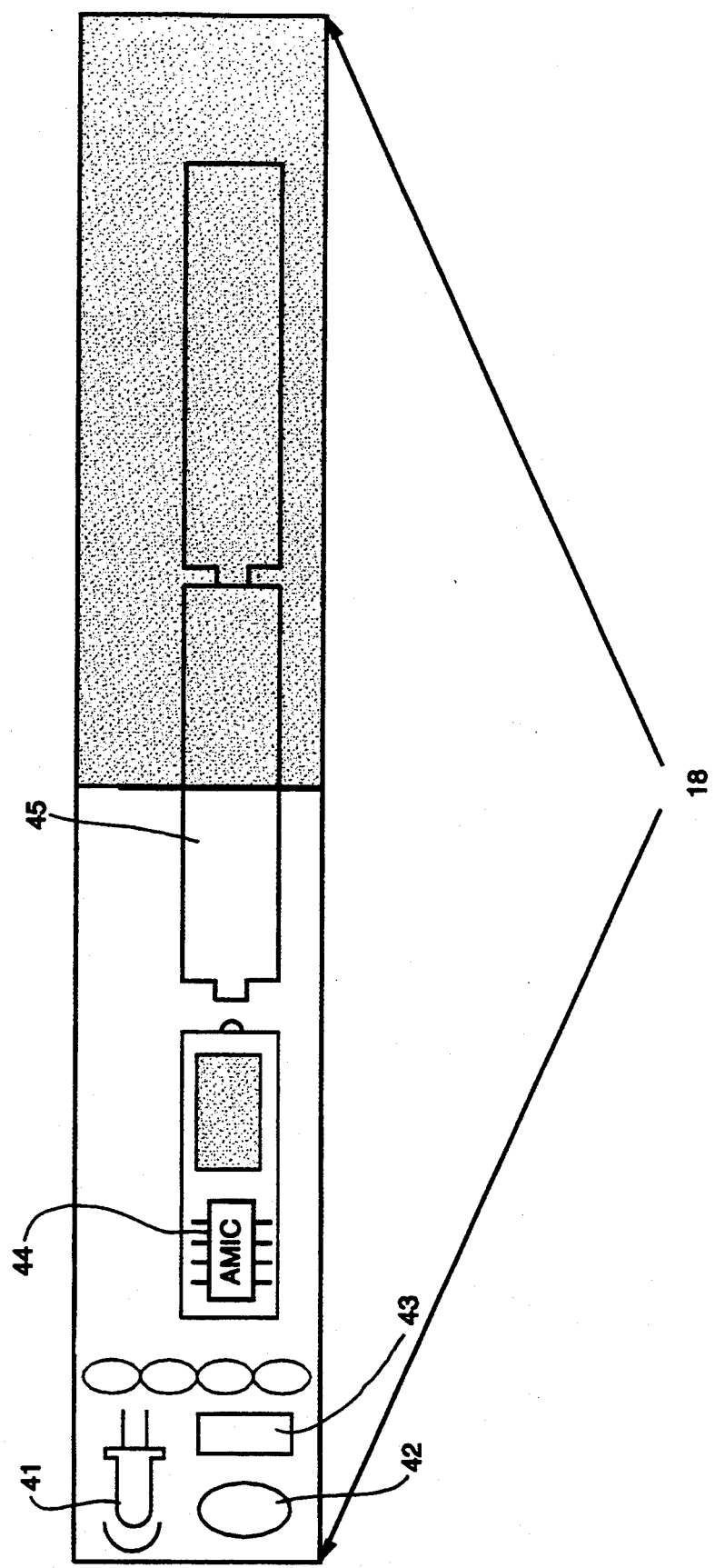

INTERACTIVE TELEVISION AND VIDEO GAME SYSTEM

FIELD OF THE INVENTION

The invention relates to an interactive video game-television system for video game player interaction with television displays. More particularly, input television signals provide encoded video game information to effect cued insertion of video game cartridge data for overlay display on the television screen. A video game player, equipped with a remote optical pointing device, can interact with the overlay video display and thereby play the video game.

BACKGROUND OF THE INVENTION

Television signals, whether input via standard broadcast method, cable input or from a video cassette recorder (VCR) conform to a communications standard whereby 525 lines of bandwidth are transmitted including approximately 483 lines of visible video information data. The remaining unused bandwidth, known as the vertical blanking interval, is available for transmitting additional encoded information. Presently, a portion of the vertical blanking interval (VBI) is used with some television programming which is "closed captioned for the hearing impaired." The captions, or text of the spoken information, is encoded and sent in the VBI along with the video information. At the receiver, i.e. the television, the VBI encoded data is decoded in closed caption circuitry and displayed on the television screen along with the video information. Either the VBI encoded caption information or the video information is subjected to a transmission and/or processing delay, in order to assure simultaneous display of the caption and video information. Special closed caption circuitry is provided for connection to a standard television unit for the decoding and display of caption information.

Similarly, other information may be transmitted in the vertical blanking interval of a video signal provided that the television unit receiving the transmission is equipped to decode and use the information. In a paper entitled "VPS a new System for domestic VCR start/stop by programme labels transmitted within the insertion date line," by Arthur Heller, *Broadcast Sessions Symposium Record* (June 1985), the insertion of cuing information in the VBI is taught to effect the recording operation by a video cassette recorder (VCR) associated with the receiving television. In accordance with the VBI data, the VCR begins recording a program at the start of the program, not at a preset scheduled time which is frequently subjected to unannounced change. Presumably, one could transmit the encoded commercial insertion interval information, as well, to cause the VCR to cease recording at the beginning of a commercial break and resume recording at the end of the commercial break.

Another example of VBI encoded data use is found in U.S. Pat. No. 4,592,546 of Fascenda et al. The Fascenda patent teaches the use of VBI transmitted data for the communication of information to subscribers, whose television sets may be equipped to decode and display contest information. Subscribers are provided with input devices for entering predictions of subsequent events in the displayed program (e.g., football plays). In this manner, Fascenda provides a level of interaction with the television programming for the viewer.

Owners of cartridge video game systems, such as Nintendo or Sega systems, regularly interact with displays on the television screen; however, the displays are generated and controlled by the program contained in the video cartridge, not transmitted television programming. Yet another patent, U.S. Pat. No. 5,083,800, which issued to David Lockton on Jan. 28, 1992, teaches a system for initializing and providing updated video game parameters, via FM or VHF transmission, to remotely located video game users who are concurrently playing the same game. Periodically, the remote users' scores are uploaded to a central facility for competitive ranking and/or contest prize allocation. As with other "interactive" systems, however, the video game is separate from any television programming. Truly interactive television would provide video game interaction with the transmitted television programming.

It is therefore an objective of the present invention to provide an interactive video game-television programming system.

It is further objective of the present invention to transmit video game cuing information in the vertical blanking interval of transmitted television signals.

It is another objective of the invention to synchronize television video information with video game cartridge information for coordinated intermingled display.

Yet another objective is to provide a remote pointing device for use with an interactive video game-television system.

SUMMARY OF THE INVENTION

These and other objectives are realized by the inventive system wherein information on a video game cartridge is accessed in response to encoded signals transmitted with the television signals, for example in the vertical blanking interval of the transmitted television signals. The encoded signals are decoded and video game information accessed from the cartridge to create NTSC video game signals. The NTSC video game signals are synchronized for insertion, in whole or in part, into the stream of NTSC video television signals. A cursor, or other orientatable display icon, is provided with the NTSC video game signals. A hand controller, ideally a remote optical pointing device, is then operated by the user to interact with the displayed NTSC video game signals, specifically the cursor or icon. When using a remote pointing device, an optical pickup device located at the television unit receives signals from the hand-held device and effects movement of the displayed cursor or icon in accordance with the player's movement of the remote device.

BRIEF DESCRIPTION OF THE INVENTION

The invention will now be described in further detail with specific reference to the drawings wherein.

FIGS. 3a-3h provide a representative sequence of display images available when utilizing the present invention.

FIG. 4 illustrates an optical pointing device for use with an interactive video-game television system.

DETAILED DESCRIPTION OF THE PREFERRED EMBODIMENT

In the present invention, data is encoded into an incoming television signal in such a way that the incoming signal appears normal when viewed on standard video equipment. When the television signal is provided to a system which incorporates the features of the invention, the encoded data can be separated from the video television signal, provided to the interconnected game system for ultimate display of the video game graphics and/or sound effects with, or in replacement of, the video television signal.

As mentioned above, one method of encoding the video game and synchronizing information is in the vertical blanking interval (VBI) of the television signal. In a standard television signal, there are 525 lines per frame, with each frame consisting of two fields. Within each field, 21 horizontal lines are blanked for the vertical blanking interval, during which time the vertical scan is retraced, or returned to the top of the scanning area. Of those 21 lines, on average, the first 9 lines are used for vertical synchronizing information, while 10–12 lines of a typical NTSC field remain available for communication of other information. With each single line comprising 32 bytes of data and 10 lines per field available at the standard scanning rate of 60 fields per second, 19,200 bytes of data can be communicated in this manner in a single second, for a data rate of 153,600 bits per second. For data storage and communication via a video cassette, the amount of available space for communication of other information is limited not only due to the limited bandwidth of the tape, but also due to the corruption of data which occurs as a result of the various synchronizing methods employed by VCR manufacturers. However, VBI encoding methods can utilize at least 5 lines per field for a standard VCR cassette, thereby providing data at a rate of 3300 bytes or 28,800 bits per second. Other encoding methods involving other features of the transmitted signal can also be utilized, but the preferred embodiment at this time comprises VBI encoding. The information which is encoded in the VBI consists of data and commands for the video game system as well as the standard NTSC synchronization information. The commands tell the video game system to perform such actions as: display a particular graphic image on the screen, switch into or out of overlay mode (i.e., display video television signal, display video game signal or display a combined signal), display a text message at a given location using text characters transmitted as data in the VBI, enable or disable a cursor or iconic image on the screen, define graphical areas on the screen which can be used to create interactive game boards, etc.

Figure 1:
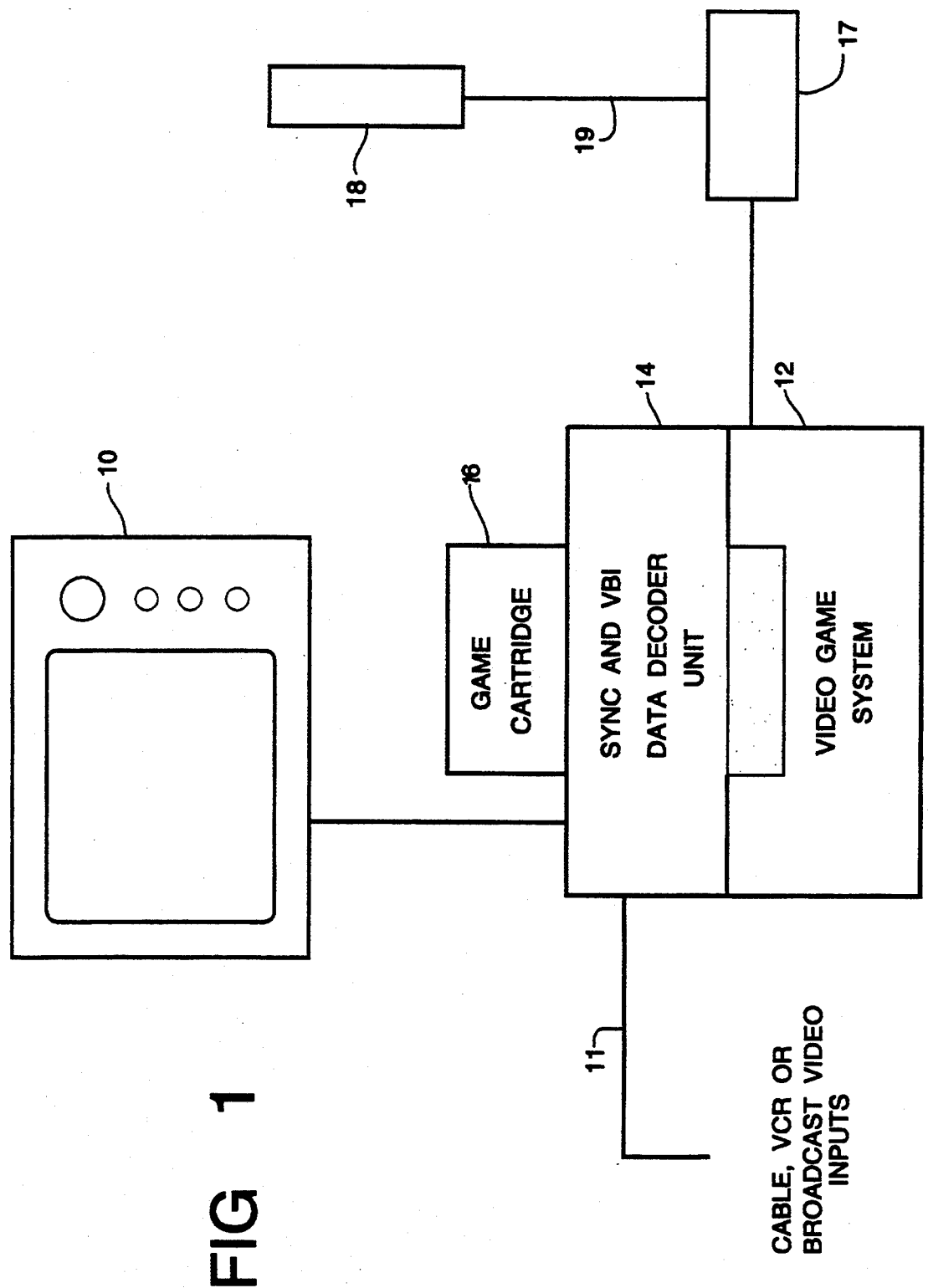
FIG. 1 illustrates a schematic of one embodiment of the interactive video game-television system of the present invention.

The interactive video game-television system of the present invention, using VBI encoding of data in accordance with well-known encoding techniques, will first be detailed with reference to the schematic illustration of FIG. 1. A transmitted television signal 11, including NTSC video television information along with synchronization information and video game information encoded in the VBI of the transmitted television signal, is provided to the system from one of a variety of sources, including cable, broadcast or video (i.e., VCR) input. Rather than being provided directly to the television set 10 however, the input television signal is provided to the Sync & VBI Data Decoder Unit 14. The Sync & VBI Data Decoder Unit 14, is a custom hardware module which is inserted into the video game cartridge port of the video game system 12. In the Sync & VBI Data Decoder Unit, the VBI is decoded and, in response to the information contained therein, video game graphics and sound effects resident in cartridge 16 are accessed, re-clocked and converted into an NTSC video game signal which is mixed with the NTSC video television signal for output to and display on television 10. Necessarily, the NTSC television signals are subjected to a delay, upon transmission or processing, with respect to the VBI video game information to allow time for the processing of the VBI video game information is the Sync & VBI Data Decoder Unit.

The Sync & VBI Data Decoder Unit 14 includes a game cartridge port for insertion of custom video game cartridges developed for use with the invention. The output 15 of the Sync & VBI Data Decoder Unit 14 is provided for display at television 10. Output 15 is the standard NTSC video television information and audio from the television signal or an NTSC video game signal (including graphics, chip sounds and/or synthesized voice), or a combination of the television and video game audio and video signals, each of the latter two alternatives including a display of a video game cursor or icon. At any time during which the television 10 is displaying either the NTSC video game signal or a combination signal wherein a cursor or icon is displayed, a viewer may interact with the display. Using a hand-held controller 18, the viewer may control the location of the cursor or icon, in the same way as one of the well-known peripherals, e.g. a mouse or a joystick, controls a cursor or icon, in order to interact with and play the game. As illustrated, a remote hand-held device, such as the wand 18 which will further be described with reference to FIG. 4, communicates the viewer's movements to an associated infrared receiver 17 which is connected to the video game system 12 at the hand controller port. The video game system receives the user input at its hand controller port and communicates the information to the Sync & VBI Data Decoder Unit 14, for insertion of cursor movement signals in output 15. In this manner, the viewer sees the cursor move in response to his movement of the remote device, while the game system is made aware of the interaction for cuing of the appropriate responses (e.g., "Congratulations! You beat the giant!") for subsequent display.

Figure 2:
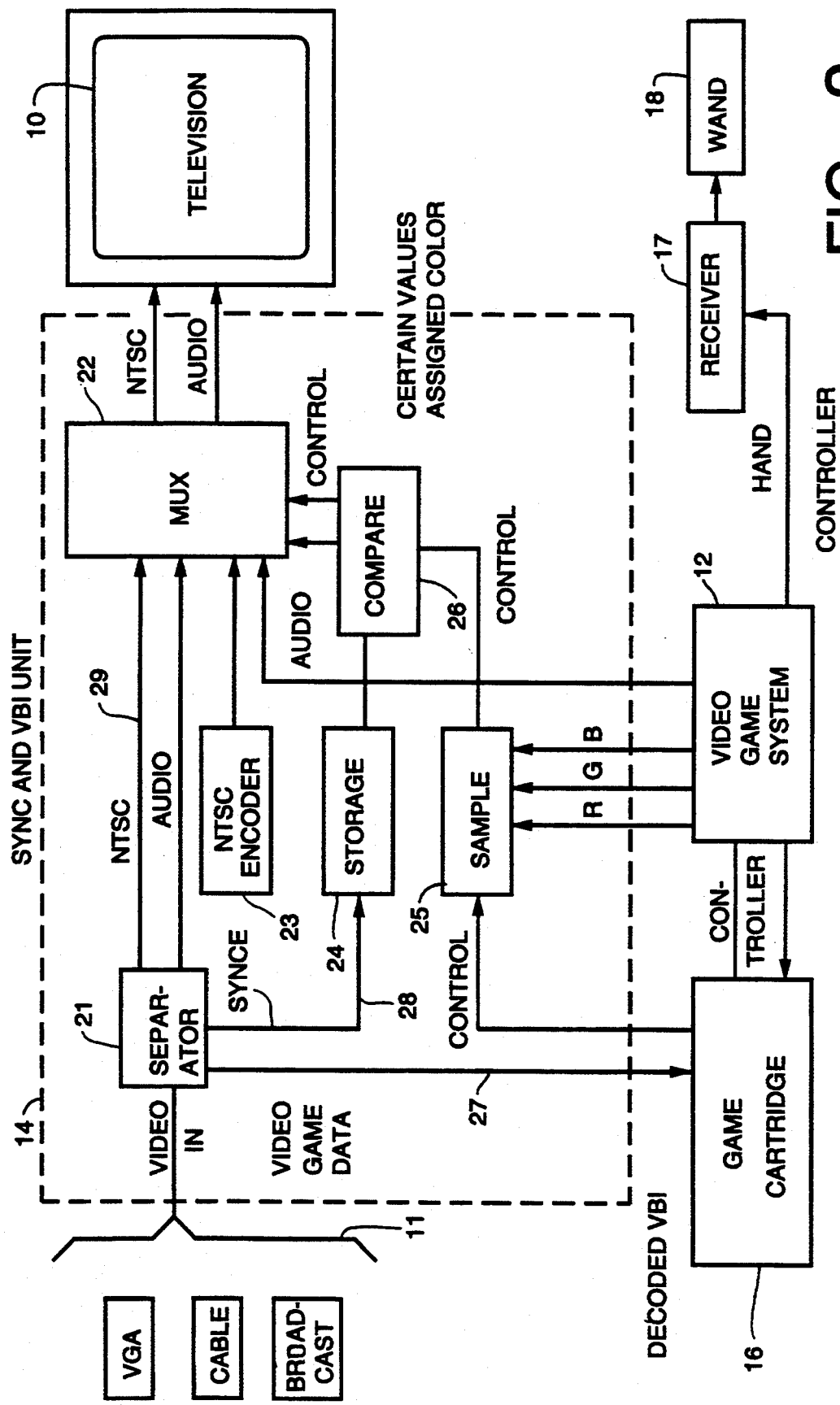
FIG. 2 is a block representation of the inventive system, specifically including the components of the Sync And VBI Data Decoder Unit.

In further detail, and with reference to FIG. 2, in the Sync & VBI Data Decoder Unit 14, the input signal is first provided to a Separator, 21. In Separator 21, the VBI information is stripped off of the input signal and decoded. The NTSC video television information and television audio signals are passed along line 29 to Multiplexer 22. At the Multiplexer 22, the integration of the NTSC video television signal and the NTSC video game signal will be conducted in response to signals from the Compare Circuitry 26, and the television audio and/or video game audio signals will be output in response to control signals from the decoded VBI data, as will be further detailed herein.

The video game information which has been extracted from the VBI is provided to access the graphics and sound effects which are resident in the custom cartridge 16. The Video Game System 12 is also accessed for receipt and communication of peripheral input, as will be further detailed herein with reference to FIG. 4 and the hand controller and receiver, 18 and 19 respectively. Upon receipt of the video game information from the VBI, cartridge 16 accesses the game graphics, etc. and related instructions sets from the library resident in the cartridge 16. The cartridge communicates with the Video Game System 12 and prompts it to send the "requested" analog (RGB) signals to the Sync & VBI Data Decoder Unit 14. At the same time, video game audio signals are sent directly to Multiplexer 22. In the Sample Circuit 25 of the Sync & VBI Data Decoder Unit, the analog signals are sampled at high frequency, digitized and then provided for storage at Storage Location 24. The amount of memory which must be available for storage of entire frames of video game information is large, however since the resolution for video game graphics is generally lower than for television signals, the requirements for storing full frames of information are not unduly burdensome.

The synchronization information which has been extracted from the transmitted television signal, is sent along line 28 to Storage Location 24 for reading out the stored information at the required synchronization rate, thereby effecting re-clocking of the digitized video game output. When integrating an existing video game system with "live" video television signals, the internal clock of the video game cannot be directly addressed for re-clocking the video game system to synchronize it to the live television signals. Therefore, the output of the video game system is re-clocked using the synchronization information which is supplied in the transmitted television signal.

As the digitized analog RGB video game output is read out of the Storage Location 24, it is synchronized to the NTSC video television signal rate but it is still an analog signal. The digitized analog RGB video game output is, therefore, provided to an NTSC encoder 23, wherein it is converted to an NTSC signal, hereinafter referred to as the NTSC video game signal. The NTSC video game signal is then provided to Multiplexer 22.

At the same time that the RGB signal is being read out to the NTSC Encoder, the RGB is simultaneously provided to Compare Circuit 26. In the Compare Circuit 26, the RGB signal is analyzed and compared to a predefined key color. The key color is a video game color which is defined by this invention, and in accordance with overlay techniques common in video display boards technology, as transparent. When the video game signal includes the key color, those areas in which the key color is found will be transparent on the television display. In those "transparent" areas, therefore, the video television signal will be displayed while the video game signal will be visible in all other overlying areas. If the entire video game signal is comprised of the key color, in accordance with the VBI video game input, then the video television signal is displayed with no overlay of video game information. Based upon a comparison of the RGB signal, therefore, the Compare Circuit 26 signals Multiplexer 22 to effect overlaying and/or switching of the video signals.

From the Multiplexer 22, the NTSC video television signals and the NTSC video game signals are output in accordance with the key color select signals provided by the Compare Circuit 26. The Multiplexer essentially functions as an overlay system. The overall system is designed to replace parts of the live NTSC video television signal with the NTSC video game signal generated by the game system. If the entire image area of the RGB is visible, the system acts like a switcher whereby either the live television or the video game signal is displayed; when the entire visible image area of the RGB signal is the key color, the Multiplexer switches to output only the NTSC video television signal and when the entire visible image area is other than the key color, the Multiplexer switches to display only the NTSC video game signal. However, if the RGB image area includes both key and non-key color areas, the NTSC video game image is effectively an overlay on the NTSC video television image, the NTSC video game image appearing as having windows or holes through which the background NTSC video television signal is visible. Control signals within the NTSC video game signals will signal the opening and closing of such "windows" whereby display of overlay images may be effected for a period of, for example, 5 seconds after which the video game information is dumped back into the reloadable video cartridge memory and the display returned to live television signals, with transparent video game overlay, until the next RGB comparison indicates overlay and/or switching of signal displays. Similarly, control signals provided to Multiplexer 22 will effect mixing and/or switching of television audio and video game audio for output to the television.

FIGS. 3a–3h provide sequential images which may be displayed in the operation of the present interactive video game-television system. The viewer, watching a "live" television program, observes the television character approaching a river in FIGS. 3a and 3b. These images, as captioned in the Figures, are solely NTSC video television images transmitted via broadcast, cable or VCR input. The corresponding video game information, which had been cued by the VBI information from an earlier-transmitted television signal, accessed from the cartridge library, synchronized and converted to NTSC, is provided as an overlay of the live video television signal in FIG. 3c. Therein, the live television background of the stationary sun, first river bank and background are visible on the display. Overlaying the display is the NTSC video game graphic of the character, river and second river bank. A graphics cursor is also displayed on the video game overlay of the NTSC video television display.

Figure 3A:
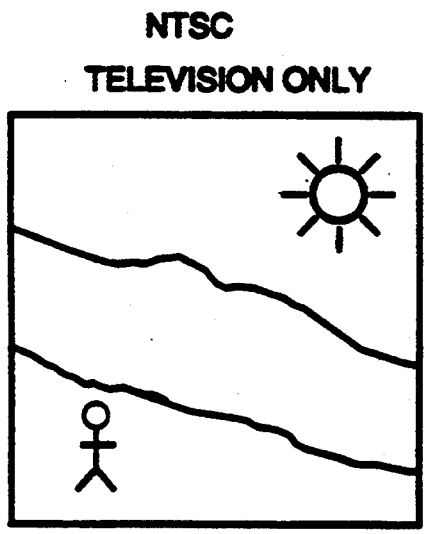
Figure 3B:
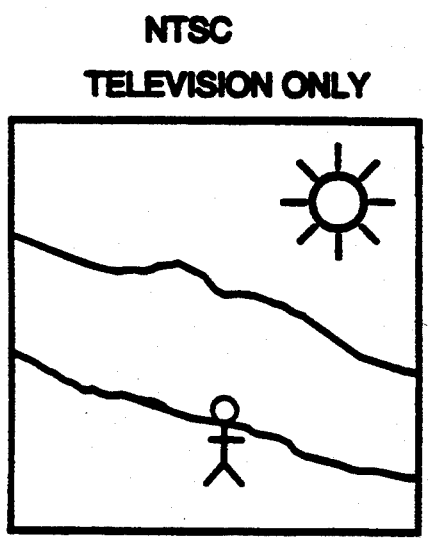
Figure 3C:
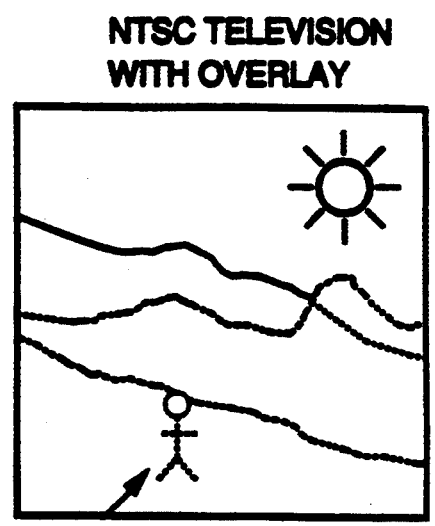
Figure 3D:
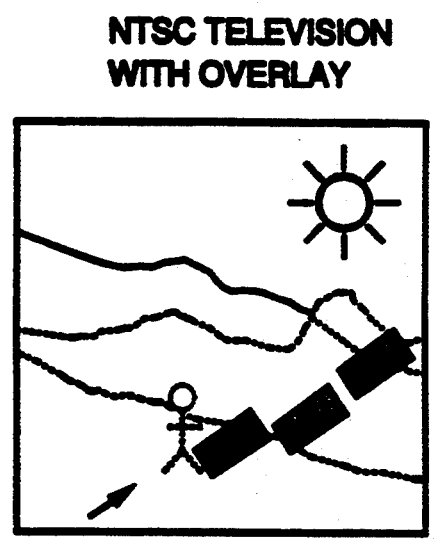
Figure 3E:
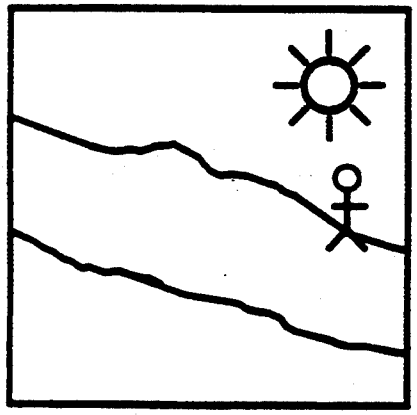
Figure 3G:
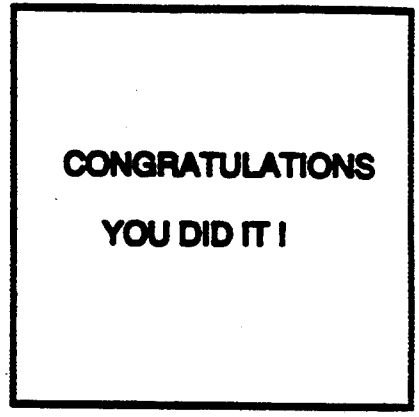
Figure 3F:
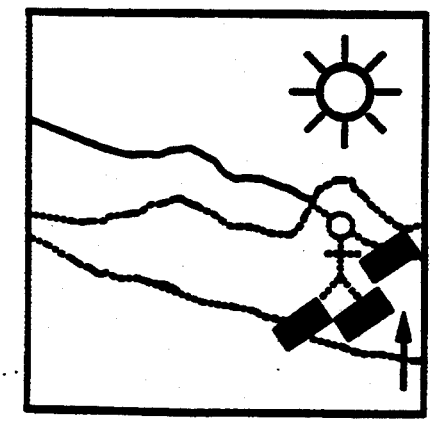
Figure 3H:
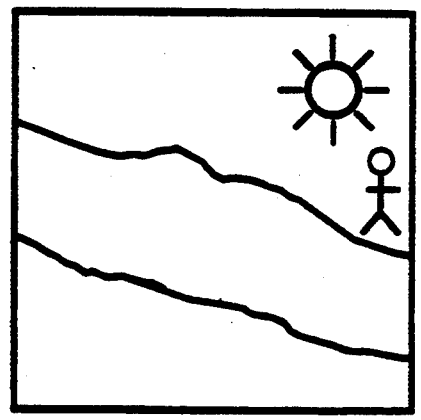

The viewer, using a remote or wired hand controller, can place a video game graphic overlay image and move it to another portion of the display as shown in FIG. 3d wherein logs are placed in the path of the character to assist the character in crossing the river. Prior to the display of these images, the game system has downloaded the information about the placement of the logs and the correct solution to the game. As the viewer is placing the logs, by moving the cursor with the hand controller, the moving image of the live video television image is still visible and would appear as FIGS. 3b and 3e sequentially to a viewer who does not have the inventive interactive video game television system. The placement of the character coincides for FIGS. 3b, c and d and for FIGS. 3e and f. If the viewer successfully places the logs and brings the character across the river, the video game system may play back a digitized audio track of a cheering crowd and display the pure video game graphic as shown in FIG. 3g. Similarly, if the viewer does not solve the maze in the allotted time, a suitable response may be displayed. At the end of the interaction, the Multiplexer, in accordance with control signals from Compare Circuit 26 switches out of the video overlay mode and the full display of the live NTSC video television signal, at FIG. 3h, continues until the next interactive segment is downloaded and cued.

FIG. 4 illustrates a hand controller, 18, which is a remote optical pointing device of the type described in the U.S. Pat. No. 5,045,843 of Hansen, the teachings of which are herein incorporated by reference, and which has been adapted for use with the present system. The remote optical pointing device includes a light emitting diode, LED 42, for communicating information to an optical pickup device, 17 of FIG. 1, located in proximity to, and connected to, the video game system, 12 of FIG. 1, and lens 42 and photodiode 43 for detecting emissions, such as infrared, from an LED located at the pickup device. Broadly speaking, the intensity and the location of the emissions incident on photodiode 43 of the hand controller 18 vary in accordance with the location and position of the hand controller in relation to the pickup device. The microcomputer chip, AMIC 44, in the hand controller, is programmed to determine the x and y coordinates of the hand controller based upon the radiation received at the photodiode 43. Upon determination of the coordinates, the hand controller communicates the information, via LED 41, back to the pickup device 17. The pickup device, which is connected to the hand controller port of the video game system, provides the coordinates information to the video game system in the same manner as wired mouse or joystick information is communicated for cursor movement during video game play. The hand controller is uniquely adapted for ease of use, including one or more power supply sources 45 (e.g., batteries) for remote operation. The hand controller may be provided with a capacitive outer membrane to provide instantaneous activation of the hand controller upon contact with a user's hand. The presently preferred embodiment of the remote optical pointing device and optical pickup device system utilizes infrared optical communication, although alternative communication methods, including methods other than optical, are contemplated.

The present invention has been described with reference to a preferred embodiment. One skilled in the art may effect modifications not specifically mentioned herein without departing from the spirit and scope of the appended claims.

What is claimed is:

1. A system for providing display of signals simultaneously from a video game system with television signals comprising:
   means for accessing video game signals;
   means for synchronizing said video game signals to said television signals; and
   means for selectively displaying said video game signals with said television signals comprising means for identifying transparent areas in said video game signal and means for displaying said video game signal overlaying said television signal.

2. The system of claim 1 further comprising means for digitizing said accessed video game signals.

3. The system of claim 1 further comprising means for converting synchronized video game signals to NTSC video game signals.

4. The system of claim 1 further comprising switch means for displaying television signals when all of said video game signals comprises transparent areas.

5. The system of claim 1 further comprising means for enabling said selective display means.

6. The system of claim 5 wherein said means for enabling comprises means for switching said selective display means in response to video game control signals.

7. The system of claim 1 further comprising controller means for interacting with said video game signals.

8. The system of claim 7 wherein said controller means comprises a wireless controller and further comprising means for receiving input from said wireless controller and means for communicating said input to said video game system.

9. A television system comprising:
   receiver means for receiving signals including video television signals, video game data and synchronization signals;
   means for generating video game signals in response to said video game data;
   means for synchronizing said video game signals to said video television signals in response to said synchronization signals; and
   means for selectively displaying said video game signals simultaneously with said video television signals, comprising means for identifying transparent areas in said video game signal and means for displaying said video game signal overlaying said television signal.

10. The television system of claim 9 wherein said video game data comprises encoded video game data and further comprising means for decoding said encoded video game data.

11. The television system of claim 9 wherein said means for generating video game signals comprises a video game system for generating video game signals in response to said video game data.

12. The television system of claim 11 wherein said means for generating video game signals further comprises means for digitizing said video game signals.

13. The television system of claim 9 further comprising means for converting synchronized video game signals to NTSC video game signals.

14. The television system of claim 9 further comprising switch means for displaying television signals when all of said video game signals comprises transparent areas.

15. The television system of claim 9 further comprising means for enabling said selective display means.

16. The television system of claim 15 wherein said means for enabling comprises means for switching said selective display means in response to video game control signals.

17. The television system of claim 9 further comprising controller means for generating video game control signals for interacting with said video game signals.

18. The television system of claim 17 wherein said hand controller comprises a wireless controller and further comprising means for receiving input from said wireless controller and means for communicating said input to said video game system.

19. A video system for providing video game overlay of displayed NTSC television signals comprising:
   receiver means for receiving transmitted signals including NTSC television signals, encoded video game information and synchronization data;
   separator means for separating said transmitted signals and outputting NTSC television signals, encoded video game information and synchronization data;
   decoder means for decoding said encoded video game information;
   video game means for generating at least one video game signal in response to said decoded video game information;

sampling means for receiving and digitizing said at least one video game signal;

synchronization means for synchronizing said at least one digitized sampled video game signal to said NTSC television signals in accordance with said synchronization data;

conversion means for converting said at least one synchronized video game signal to NTSC video game signals;

overlay means for simultaneous display of said at least one NTSC video game signal and said NTSC television signal; and means for identifying transparent areas in said synchronized video game signal and outputting control signals.

20. The video system of claim 19 wherein said overlay means further comprises switching means for displaying either said NTSC video game signal or said NTSC television signal in response to output from said identifying means.

21. The video game system of claim 19 further comprising controller means for generating video game control signals for interacting with said NTSC video game signal.

22. The video game system of claim 21 wherein said controller comprises a wireless controller and further comprising means for receiving input from said wireless controller and means for communicating said input to said video game means.

23. A method for providing interaction of a video game system via controller signals during display of television signals comprising the steps of:

providing at least one signal comprising video television signals, encoded video game data and synchronization data;

decoding said encoded video game data;

generating video game signals by providing decoded video game data to said video game system, outputting video game signals from said video game system in response to said decoded video game data, and digitizing said video game signals;

synchronizing said video game signals to said video television signals in response to said synchronization data;

identifying transparent areas of said video game signals;

displaying video game signals simultaneously with said video television signals; and varying said display of said video game signals in response to said controller signals.

24. The method of claim 23 wherein said controller comprises a wireless controller for generating controller signals and wherein said varying comprises receiving controller signals from said controller and varying said display in response to said received controller signals.

25. The method of claim 23 further comprising the steps of encoding video game data and inserting said encoded data in the vertical blanking interval of said at least one signal.

26. The method of claim 23 further comprising converting said synchronized video game signals to NTSC video game signals.

27. The method of claim 23 wherein said displaying comprises overlaying said video television signals with said video game signals.

28. The method of claim 27 further wherein said displaying comprises switching from display of said video game signal to display of said video television signal upon identification of all areas of said video game signal as transparent.

29. The method of claim 23 wherein said displaying comprises switching from display of said video television signal to display of said video game signal upon identification of said video signal.

30. A method for providing interaction of a video game system via controller signals during display of television signals comprising the steps of:

providing at least one signal comprising video television signals, encoded video game data and synchronization data;

decoding said video game data;

generating video game signals by providing video game data to said video game system, outputting video game signals from said video game system, and digitizing said video game signals;

synchronizing said video game signals in response to said synchronization data;

displaying video game signals and said video television signals by identifying transparent areas of said video game signals prior to said displaying and overlaying said video television signals with said video game signals wherein said display of said video television signals comprises said transparent areas of said video game signals; and varying said display of said video game signals in response to said controller signals.

* * * * *